Figure 1:
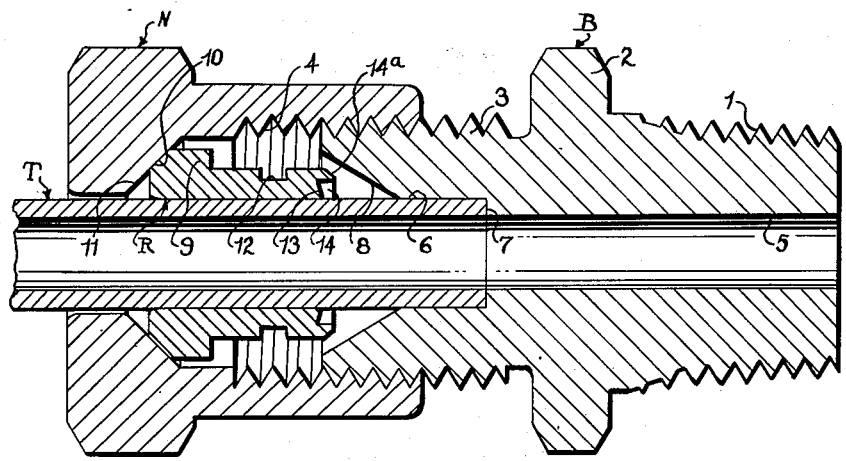

Jan. 2, 1951  R. E. HEROLD  2,536,745
TUBE COUPLING
Filed June 14, 1946

INVENTOR.
ROBERT E. HEROLD
BY
Richey & Watts
ATTORNEYS

Patented Jan. 2, 1951

2,536,745

UNITED STATES PATENT OFFICE 2,536,745

TUBE COUPLING

Robert E. Herold, Cleveland, Ohio, assignor to The Weatherhead Company, Cleveland, Ohio, a corporation of Ohio Application June 14, 1946, Serial No. 676,666

3 Claims. (Cl. 285—122)

This invention relates to tube couplings, more particularly to a tube coupling wherein a metal ring or sleeve member is deformed against a tube or pipe so that a forward cutting edge thereof cuts into and shears up metal of the pipe, forming a fluid-tight joint with great mechanical strength. It has been found that stainless steel tubing, because of its relatively high tensile strength and toughness, is difficult to grip with cutting rings of the type to which this invention relates without requiring excessive force in setting up the fitting which force tends to deform or mutilate the body member of the fitting by which the cutting ring is compressed.

It is an object of this invention to reduce the amount of force necessary to set up a fitting against stainless steel tubing and, briefly, this is accomplished by relieving an intermediate portion of the cutting sleeve so that it can buckle during the tightening operation and simultaneously providing clearance between the sleeve and the fitting body to permit such buckling.

It is another object of this invention to facilitate this buckling action by providing a novel cutting edge arrangement which is more conducive to producing the buckling action of the sleeve.

These and other objects will appear in the accompanying detailed description.

Figure 2:
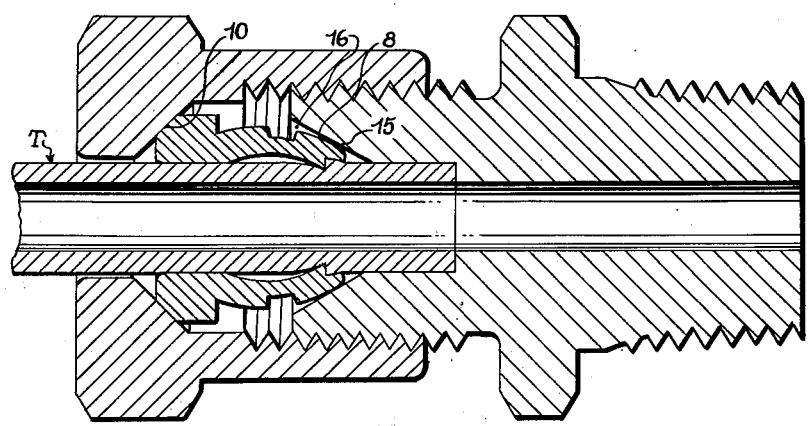

In the drawings:

Fig. 1 is a cross sectional view of my coupling before the members are tightened together; and Fig. 2 is a similar section after they are tightened.

Referring to Fig. 1, the coupling is made up of three basic parts, a body B, a nut N and a cutting sleeve or ring R clamped therebetween. These cooperate with the tube T in the manner hereafter described. Body B has suitable means 1 for attaching to a mating device. Wrench receiving means 2 and external threads 3 may also be formed on the body, the threads 3 cooperating with threads 4 of the nut in the usual manner. The body is bored through as at 5 to form a fluid passageway. An enlargement of the bore forms a shoulder 7 for receiving the end of the tube T and preventing further mention thereof into the coupling body. The body is formed with an outwardly flaring conical wall 8 which is intended to compress the forward portion of the cutting sleeve causing it to shear into the tube T. The cutting sleeve R has a flange portion 9 and a rearward convex or tapered portion 10 for cooperating with a complementary tapered portion 11 of the nut N.

The forward or cutting end of the sleeve R has a cutting edge 13 which may be formed thereon by an undercut recess 14 at the end of the ring.

When the nut is tightened, as seen in Fig. 2, the forward end portion of the ring engages the conical wall 8 on the body in response to pressure exerted against the rear tapered portion 10 by the nut. Compression of the forward end of the ring by the tapered body part as at 15 causes the cutting edge 13 to cut into and shear up metal of the tube and, at the same time, the relieved portion 12 of the sleeve permits the ring to buckle. It will be noted that the engagement of the ring with the body at 15 is well forward of the relieved portion so that even when the sleeve is buckled somewhat, there remains a clearance as at 16 between the sleeve and the body, to permit further buckling action to take place. One advantage of the buckling action lies in the fact that when the sleeve buckles, the axial pressure from the nut is applied in a more radial direction against the tube, which facilitates the cutting into and shearing up of the tough tube material by the sleeve cutting edge 13. In this manner the relieved portion of the ring, coupled with the clearance between the ring and the body, work together to reduce the amount of setting up pressure required to effect a given amount of cutting into and sealing with the tube.

It will also be noted that when engagement first takes place between the ring and the body, the wall 14a, which overhangs the cutting ring 13, acts as a cantilever which, in itself, tends to cause the sleeve member to buckle as the nut is tightened. This action, coupled with the fact that ample space is provided into which the ring can buckle, results in the translation of axial force into the radial cutting force previously described and reduces the amount of force required to set up the fitting. This also reduces the deforming pressure of the ring R against the conical portion 8 of the fitting body which is a desirable condition. It is by providing for this action that I have attained the improved results with my novel coupling assembly.

I contemplate that modifications may be made in the various design details thereof without departing from the spirit of the invention as defined in the appended claims, the dimensions and angles in the drawing merely being illustrative of a typical successful device.

Having thus described the present invention so that others skilled in the art may be able to understand and practice the same, I state that what I desire to secure by Letters Patent is defined in what is claimed.

What I claim is:

1. A metallic tube gripping and sealing member for use in connection with threaded coupling body members comprising a sleeve having an abutment wall adjacent one end for engagement by one of the body members, a tube cutting and shearing portion at the other end including a tube cutting edge and an overhanging portion, an intermediate portion of said sleeve being externally grooved to facilitate buckling thereof under pressure exerted by the coupling body member.

2. In a coupling, an apertured body member having a shouldered recess adapted to receive the end of a tube, said recess merging with an outwardly flaring conical wall portion, a tube cutting sleeve having a generally axial bore portion and a generally radial shoulder portion intersecting said bore portion to form a tube cutting edge, said sleeve being externally grooved intermediate the ends thereof, said sleeve having means at one end thereof for engagement with said flaring member surface, a nut threaded to said body having a flange for engagement with the other end of said sleeve, tightening of said nut on said body member simultaneously exerting a radial pressure on said sleeve at its cutting edge and buckling said sleeve at its grooved portion causing said sleeve bore portion to diverge from the tube, thereby concentrating the radial pressure between said ring and the tube at the tube cutting edge and reducing the axial pressure required to force said cutting edge into the tube.

3. A metallic tube gripping and sealing member for use in connection with threaded coupling body members comprising a sleeve having a generally axial bore portion and a generally radial shoulder portion intersecting said bore portion to form a tube cutting edge, said sleeve having abutment portions at each end for engagement with the body members, said sleeve being externally grooved intermediate the ends thereof to facilitate buckling thereof under pressure exerted by the coupling body member.

ROBERT E. HEROLD.

REFERENCES CITED

The following references are of record in the file of this patent:

UNITED STATES PATENTS

| Number | Name | Date |
| --- | --- | --- |
| 1,489,065 | Clifton | April 1, 1924 |
| 2,179,127 | Laver | Nov. 7, 1939 |
| 2,211,856 | Kreidel | Aug. 20, 1940 |